United States Patent
Chang et al.

(10) Patent No.: US 6,588,091 B1
(45) Date of Patent: Jul. 8, 2003

(54) METHOD OF MAKING MAGNETIC HEAD WITH PRECISELY DEFINED ZERO THROAT HEIGHT

(75) Inventors: Mike Yu Chieh Chang, Sunnyvale, CA (US); Mark Anthony Church, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 09/616,665

(22) Filed: Jul. 14, 2000

Related U.S. Application Data

(62) Division of application No. 09/138,307, filed on Aug. 21, 1998, now Pat. No. 6,134,080.

(51) Int. Cl.$^7$ .......................... G11B 5/127; H04R 31/00
(52) U.S. Cl. ................ 29/603.14; 29/603.1; 29/603.13; 29/576; 360/113; 360/120; 360/122; 360/126
(58) Field of Search ...................... 29/603.1, 603.13, 29/603.14, 576; 360/113, 126, 120, 122

(56) References Cited

U.S. PATENT DOCUMENTS

| | | | | |
|---|---|---|---|---|
| 4,550,353 A | * | 10/1985 | Hirai et al. .................. 360/125 |
| 5,652,687 A | * | 7/1997 | Chen et al. .................. 360/126 |
| 5,779,923 A | * | 7/1998 | Krounbi et al. ................ 216/22 |
| 5,805,391 A | * | 9/1998 | Chang et al. ................ 360/113 |
| 5,926,349 A | * | 7/1999 | Krounbi et al. ............. 360/113 |
| 5,966,800 A | * | 10/1999 | Huai et al. ................ 29/603.13 |
| 6,104,576 A | * | 8/2000 | Santini ......................... 360/126 |
| 6,166,880 A | * | 12/2000 | Kobayashi et al. ......... 360/126 |
| 6,172,848 B1 | * | 1/2001 | Santini ......................... 360/126 |
| 6,337,783 B1 | * | 1/2002 | Santini ......................... 360/317 |

FOREIGN PATENT DOCUMENTS

| | | |
|---|---|---|
| JP | 83-714874/29 | 6/1983 |
| JP | 58-111116 | 7/1983 |
| JP | 58-128017 | 7/1983 |
| JP | 6-111245 | 4/1994 |

\* cited by examiner

*Primary Examiner*—Peter Vo
*Assistant Examiner*—Paul Kim
(74) *Attorney, Agent, or Firm*—Ervin F. Johnston

(57) ABSTRACT

A method makes a magnetic head having a top and a bottom, front and rear ends and an air bearing surface (ABS) at the front end, comprising the steps of forming first and second pole piece layers with the first and second pole piece layers separated by a write gap layer at the ABS and connected at a back gap that is recessed rearwardly in the head from the ABS; forming a zero throat height (ZTH) defining layer of baked photoresist that is sandwiched between the first and second pole piece layers with the ZTH defining layer having a rounded front edge where the first and second pole piece layers first separate from one another after the ABS to define the ZTH; and forming an insulation stack with a coil layer embedded therein between the first and second pole piece layers with the insulation stack placed so that the ZTH defining layer is located entirely between the ABS and the coil layer.

8 Claims, 16 Drawing Sheets

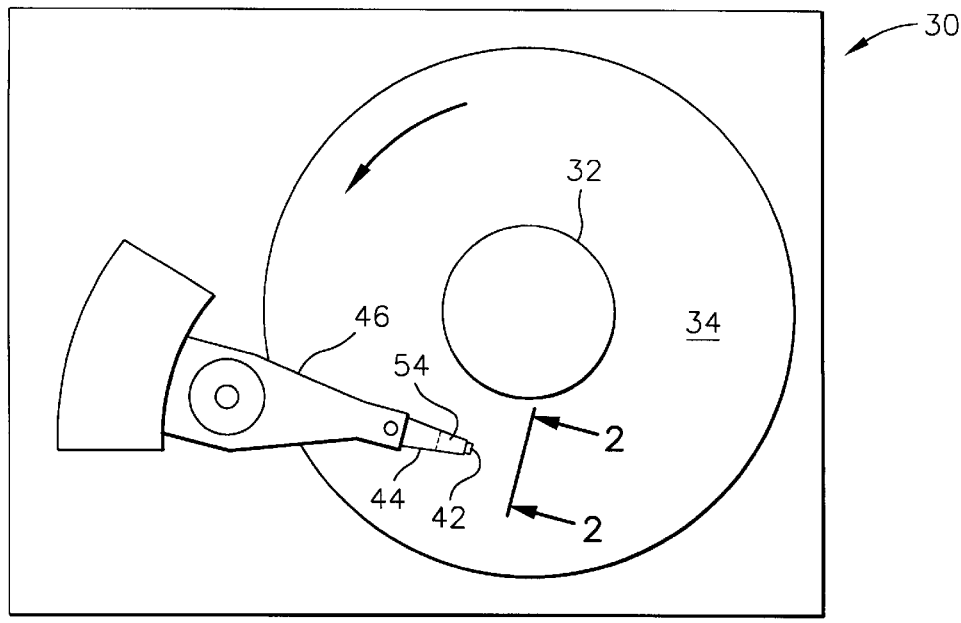
FIG. 1
FIG. 2
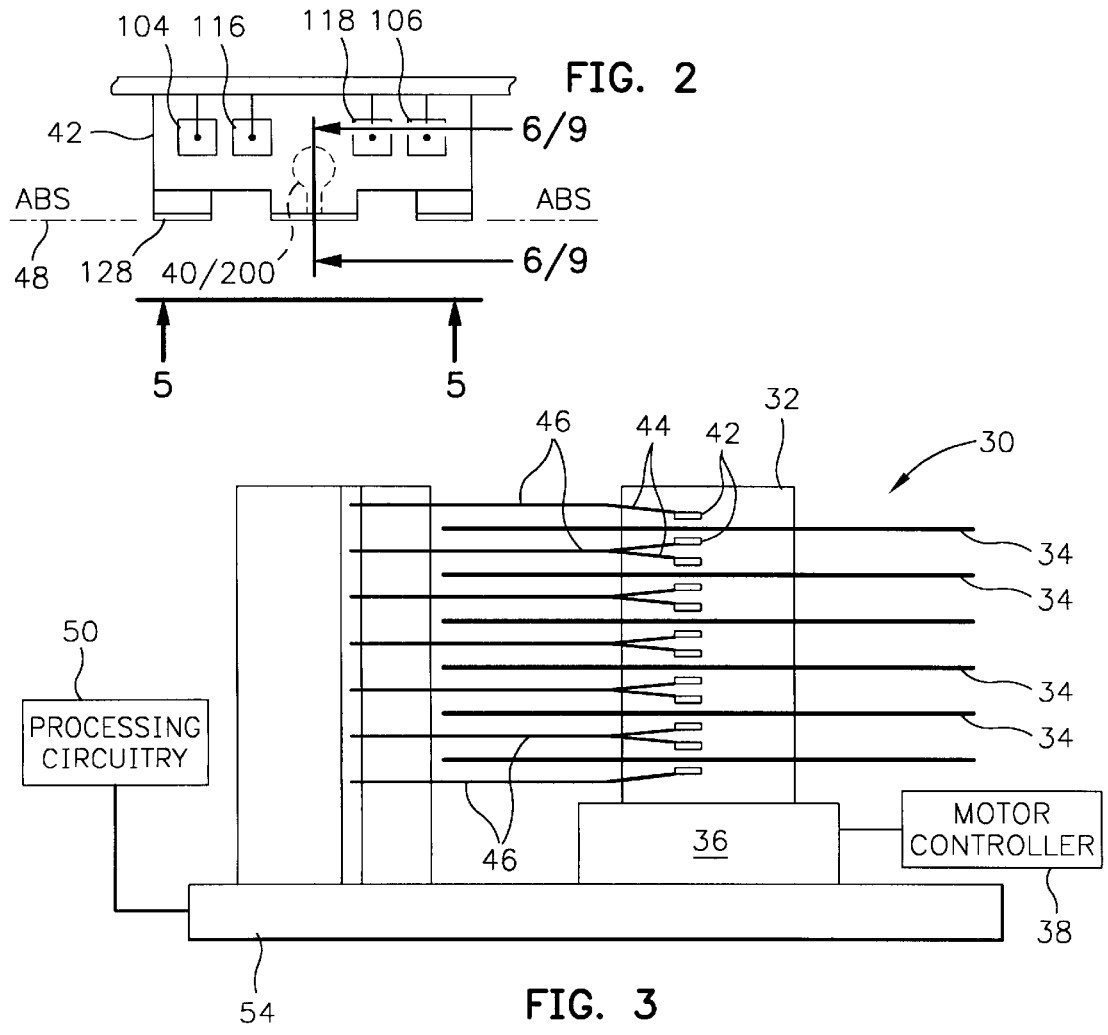
FIG. 3

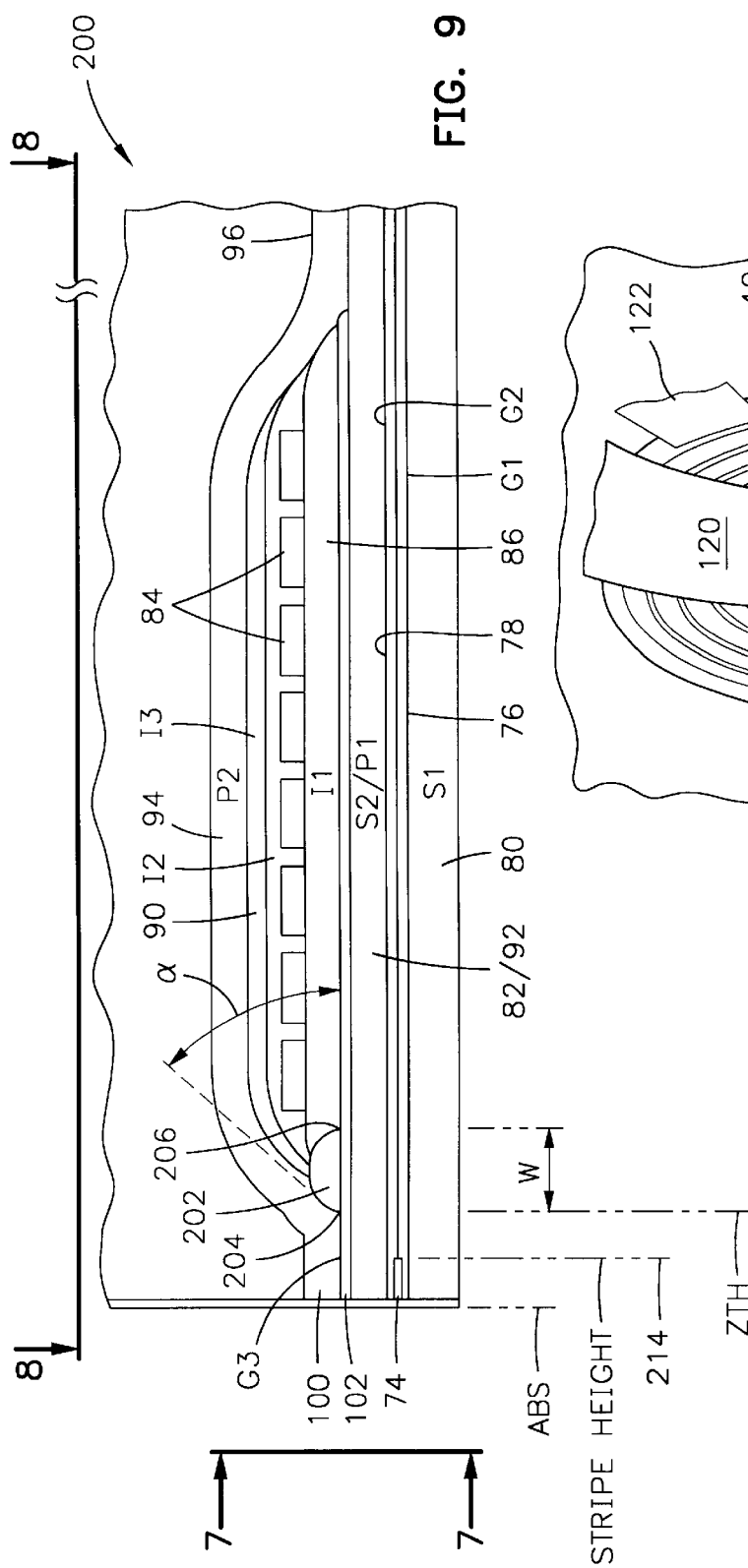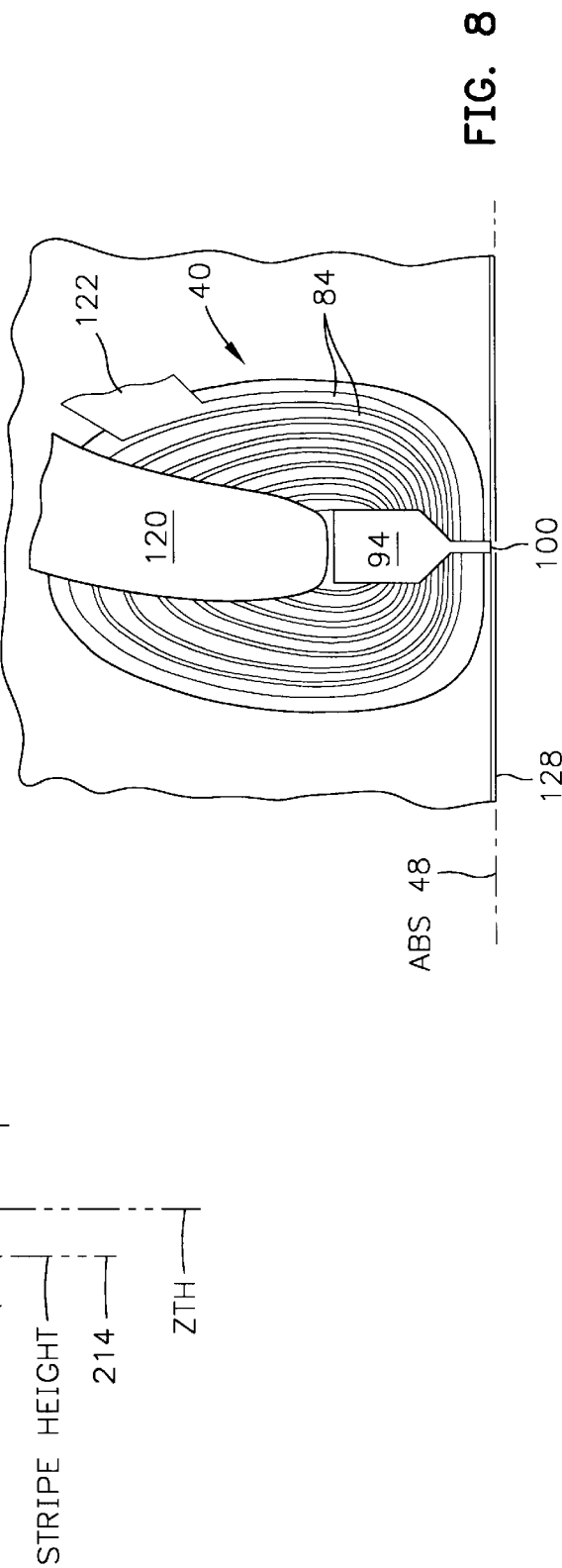

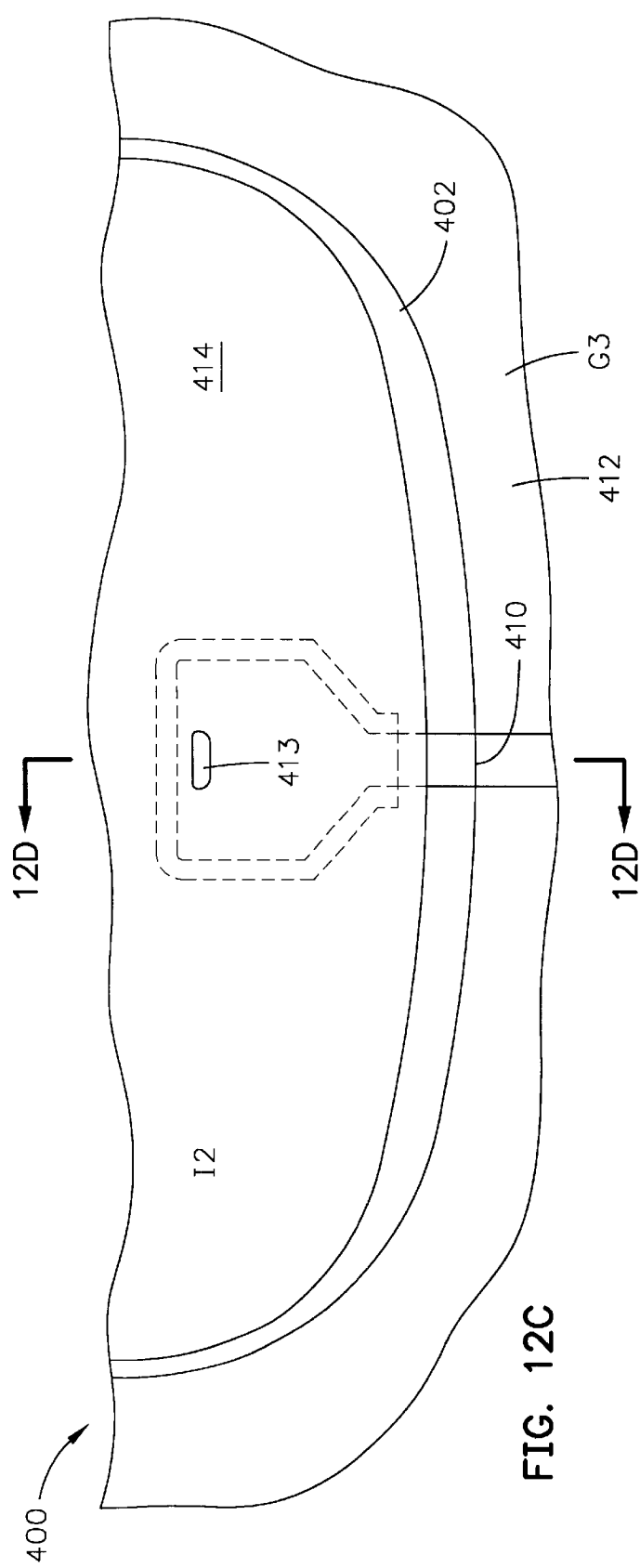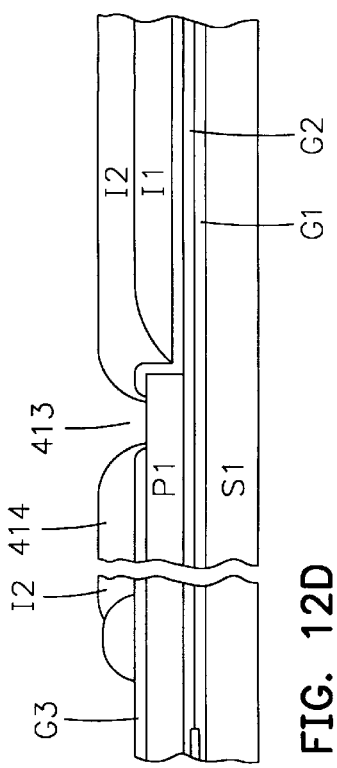
FIG. 12C
FIG. 12D

METHOD OF MAKING MAGNETIC HEAD WITH PRECISELY DEFINED ZERO THROAT HEIGHT

REFERENCE TO RELATED APPLICATION

This is a divisional application of application Ser. No. 09/138,307 filed Aug. 21, 1998 now U.S. Pat. No. 6,134,080.

BACKGROUND OF THE INVENTION

1. Field of the Invention

The present invention relates to a magnetic head with a precisely defined zero throat height (ZTH) and more particularly to a magnetic head that employs a thin strip of baked photoresist for defining the ZTH.

2. Description of the Related Art

A merged magnetic head includes a write head portion and a read head portion. The write head portion includes a coil layer embedded in first, second and third insulation layers (called "the insulation stack"), the insulation stack being located between first and second pole piece layers. A gap is formed between the first and second pole piece layers by a gap layer at an air bearing surface (ABS) of the write head. The pole piece layers are connected at a back gap. Current conducted through the coil layer produces a magnetic field in the pole pieces. The magnetic field fringes across the gap at the ABS for the purpose of writing information in the form of magnetic impressions in tracks on moving magnetic media, such as in circular tracks on a rotating magnetic disk or in longitudinal tracks on a moving magnetic tape.

The read head portion of the merged head includes a read sensor that is sandwiched between first and second gap layers. The first and second gap layers are sandwiched between first and second shield layers. The first and second gap layers magnetically insulate the read sensor from the shield layers and the shield layers protect the read sensor from stray magnetic fields. The read sensor may be an anisotropic magnetoresistive (AMR) sensor or a spin valve sensor. In either instance a recessed edge of the sensor is referred to in the art as the "stripe height" of the read head. This height is important because it establishes the magnetics of the read head. Flux signals traversing the sensor from a rotating magnetic disk causes a change in resistance in the sensor that is detected by processing circuitry when a sense current is conducted through the sensor.

An important parameter in the design of the write head is the location of the zero throat height (ZTH). The zero throat height is the location where the first and second pole piece layers first commence to separate from one another after the ABS. Flux leakage between the first and second pole piece layers is minimized by locating the zero throat height as close as possible to the ABS. Short zero throat heights have been limited by prior art methods of construction.

In the prior art, the forward sloping edge of one of the first, second or third insulation layers of the insulation stack is employed for defining the zero throat height. It is important that the zero throat height be accurately located relative to the height of the stripe of the read head. When a partially completed merged head is lapped to the specified air bearing surface the write head should have the desired zero throat height and the stripe should have the desired stripe height in order to satisfy the designed magnetics of the head. It is also important that the zero throat defining insulation layer have a forward edge at the zero throat height that slopes at an appropriate angle, which is referred to in the art as the apex angle. The first insulation layer of the insulation stack can be relatively thin which results in a low apex angle. In contrast the second insulation layer of the insulation stack is a relatively thick layer which results in a higher apex angle. A higher apex angle, such as 35 degrees, is desirable for several reasons: (1) a lower apex angle results in more flux leakage between the first and second pole piece layers and (2) a lower apex angle results in more variability (windage) in the location of the forward edge of the zero throat defining insulation layer due to subsequent processing steps.

Each insulation layer of the insulation stack is constructed of photoresist. Photoresist is spun on and planarzed across a wafer where multiple magnetic heads are to be constructed. For each head, the photoresist is photopatterned by light imaging so as to prepare portions of the photoresist for removal by developing. The photoresist is then developed leaving a photoresist layer with desired openings. The photoresist layer is then baked at a high temperature which causes it to shrink and solidify. Each of the insulation layers of the insulation stack is constructed one on top of the other commencing with the first insulation layer.

The longer the insulation layer the more the forward edge of the insulation will recess into the head due to shrinkage of the layer. When the zero throat defining insulation layer is the first insulation layer of the insulation stack it is subjected to process variations during subsequent construction of the coil layer. After the coil layer is frame plated a seedlayer is removed by sputter etching, ion milling or the like which also etches or ion mills the forward edge of the first insulation layer. This causes the forward edge of the first insulation layer to be relocated further into the head. A thin first insulation layer causes the forward edge of the layer to have a low apex angle. Unfortunately, etching or ion milling removes more of the forward edge of the layer when the apex angle is small because the full height of the layer is further back in the head. As stated hereinabove a low aspect angle also causes more flux to leak between the first and second pole piece layers.

When the second or third insulation layer of the insulation stack is selected for the zero throat defining insulation layer the forward edge has a higher aspect angle which is more favorable for reducing flux leakage between the first and second pole tip layers. Further the second and third insulation layers are not subject to etching or ion milling since they are constructed after construction of the coil layer. Unfortunately, however, the second or third insulation layers can be relatively thick and shrinkage during baking causes the forward edge of the insulation layer to be further recessed in the head than when the first insulation layer is used as the zero throat defining layer.

Accordingly, defining the zero throat height with any of the insulation layers of the insulation stack has not been satisfactory. The windage or relocation of the forward edge of the selected insulation layer during construction has made the exact location of the zero throat height unpredictable. The relative location of the zero throat height to the stripe height after lapping is then uncertain. There is a strong felt need for construction of the zero throat height insulation layer that results in a more predictable location and aspect angle of the forward edge of the layer.

SUMMARY OF THE INVENTION

The present invention provides a photoresist insulation layer that accurately locates the zero throat height of a magnetic write head with a highly predictable aspect angle at a forward edge of the insulation layer. This is accomplished by employing a discrete photoresist strip that is decoupled from the large mass of any of the first, second or third photoresist insulation layers of the insulation stack. The photoresist strip, which is located entirely between the ABS and a forward end of the coil layer, has a predetermined width as it extends from a forward sloping edge toward the back gap. Since the width of the photoresist strip is many orders of magnitude less than the length of any of the insulation layers of the insulation stack, shrinkage of the photoresist strip during the baking step is minimal. Accordingly, the location of the forward edge of the photoresist strip imaged during the light exposure step is virtually the location of the forward edge of the photoresist strip after the baking step. This greatly promotes the predictability of the zero throat height thereby achieving two significant advantages, namely: (1) locating the zero throat height closer to the ABS and (2) more accurately placing the zero throat height with respect to the stripe height of the read head. These advantages equate to improved data rates and more data stored and read by the magnetic head per square inch of the magnetic disk. Accordingly, the magnetic disk drive, which is the heart of a computer, is enabled to provide still more gigabits of stored information for the user without any increase in physical size of the disk drive.

The other important advantage of the photoresist strip is that the apex angle of the forward sloping edge of the photoresist line can be optimized with great predictability. The apex angle is directly related to the ratio of the thickness of the photoresist layer spun on the wafer to the width of the photoresist strip imaged during the light step. This ratio is referred to in the art as the aspect ratio. Accordingly, the aspect angle is increased by increasing the thickness of the photoresist. A desirable aspect angle, such as 35°, is easily achievable and predictable by spinning a sufficiently thick photoresist layer on the wafer, photopatterning and developing the layer and then hard baking the layer. An aspect angle of 35° minimizes flux leakage between the first and second pole piece layers.

The present invention is manifested in various embodiments. In one embodiment the photoresist strip is totally separate from a first photoresist layer of the insulation stack. In another embodiment, the first photoresist layer of the insulation stack is provided with an elongated hole that defines the photoresist strip. In a further embodiment the coil layer is moved forward in the head by placing the first turn of the coil layer in the elongated hole. In still further embodiment a photoresist layer accurately and predictably defines the zero throat height as well as planarizing the partially completed head with respect to the first pole piece layer.

An object of the present invention is to provide a magnetic head with photoresist that more accurately defines a zero throat height.

Another object is to provide a photoresist layer for a magnetic head that more accurately and predictably defines the zero throat height and aspect angle of a write head.

A further object is to provide a process of making a merged head that more accurately and predictably locates the zero throat height of a write head relative to a stripe height of a sensor of a read head.

Still another object is to provide a first photoresist insulation layer of an insulation stack that also provides a thin strip of photoresist forward of a coil layer for accurately and predictably defining a zero throat height and apex angle.

Still a further object is to provide the foregoing object as well as positioning a coil layer closer to the ABS than heretofore obtainable in the prior art.

Still another object is to provide a photoresist insulation layer that is planarized with respect to a first pole piece layer and that provides an accurate and predictable zero throat height and apex angle.

Other objects and advantages of the invention will be more readily appreciated upon reading the following description taken together with the accompanying drawings.

BRIEF DESCRIPTION OF THE DRAWINGS

FIG. 1 is a planar view of an exemplary magnet disk drive:

FIG. 2 is an end view of a slider with a magnet head of the disk drive as seen in plan 2—2;

FIG. 3 is in elevation view of the magnetic disk drive wherein multiple disks and magnetic heads are employed;

FIG. 8 is a view taken along plane 8—8 of FIG. 6 with all material above the coil layer removed;

FIG. 9 is an enlarged partial side view of the slider and magnetic head of the present invention as seen in plane 9—9 of FIG. 2;

FIG. 12C is the same as FIG. 12A except a second insulation layer of insulation stack has been formed;

FIG. 12D is a view taken along plane 12D—12D of FIG. 12C;

DESCRIPTION OF THE PREFERRED EMBODIMENTS

Magnetic Disk Drive

Figure 4:
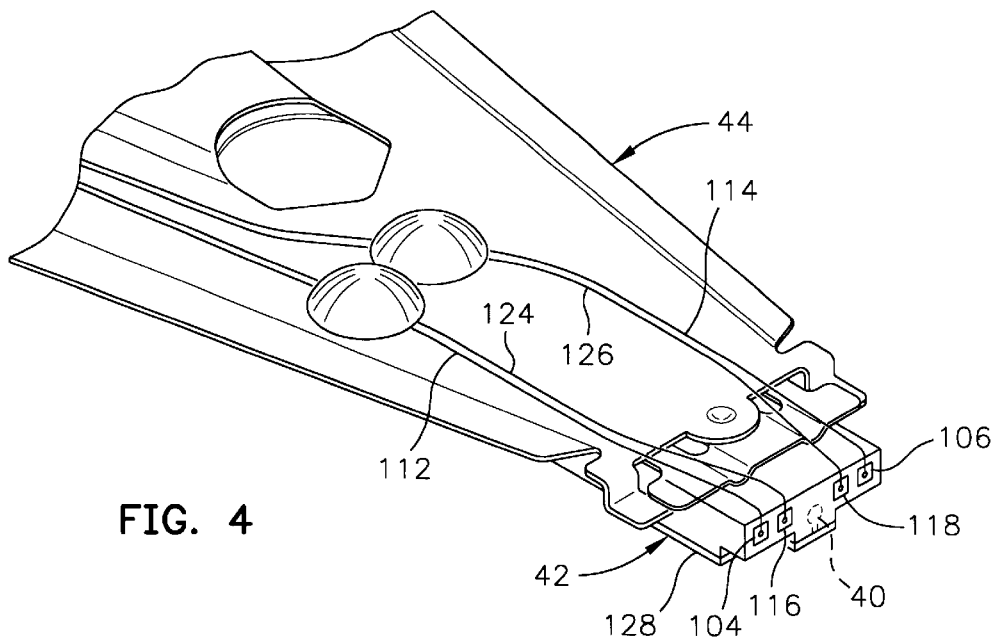
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head (merged magnetoresistive or spin valve head) 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to the form of magnetic impressions to multiple circular tracks on the surface of the disk 34, as well as for reading information in this form of magnetic impressions (bit) therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
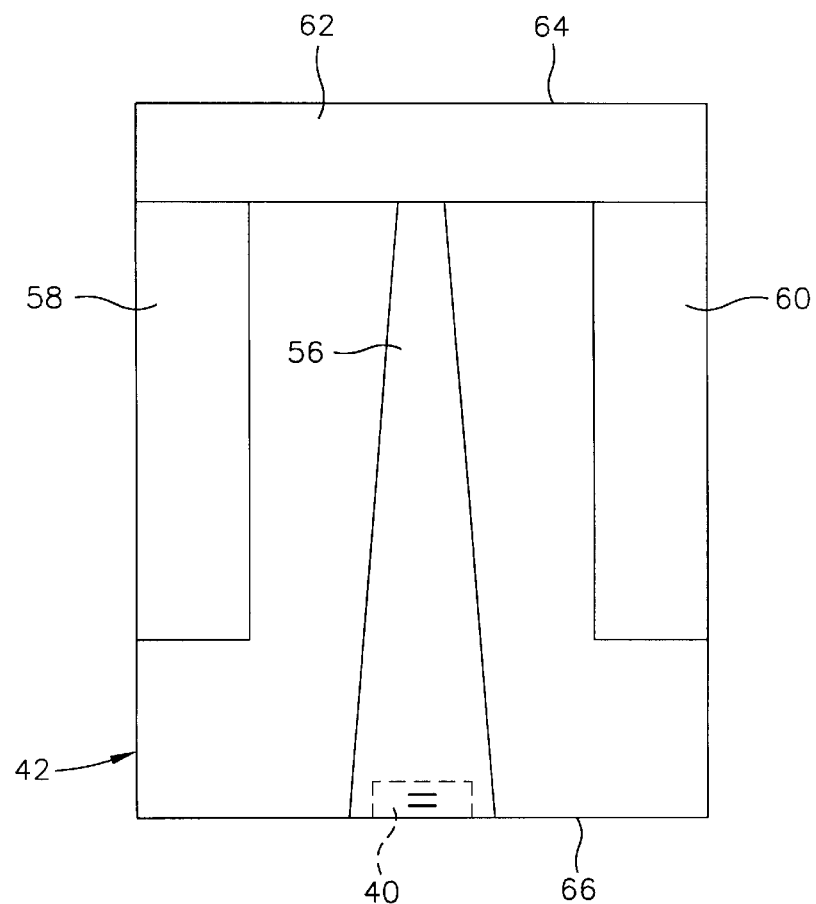
FIG. 5 is an ABS view of the magnetic taken along plan 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged Magnetic Head

Figure 6:
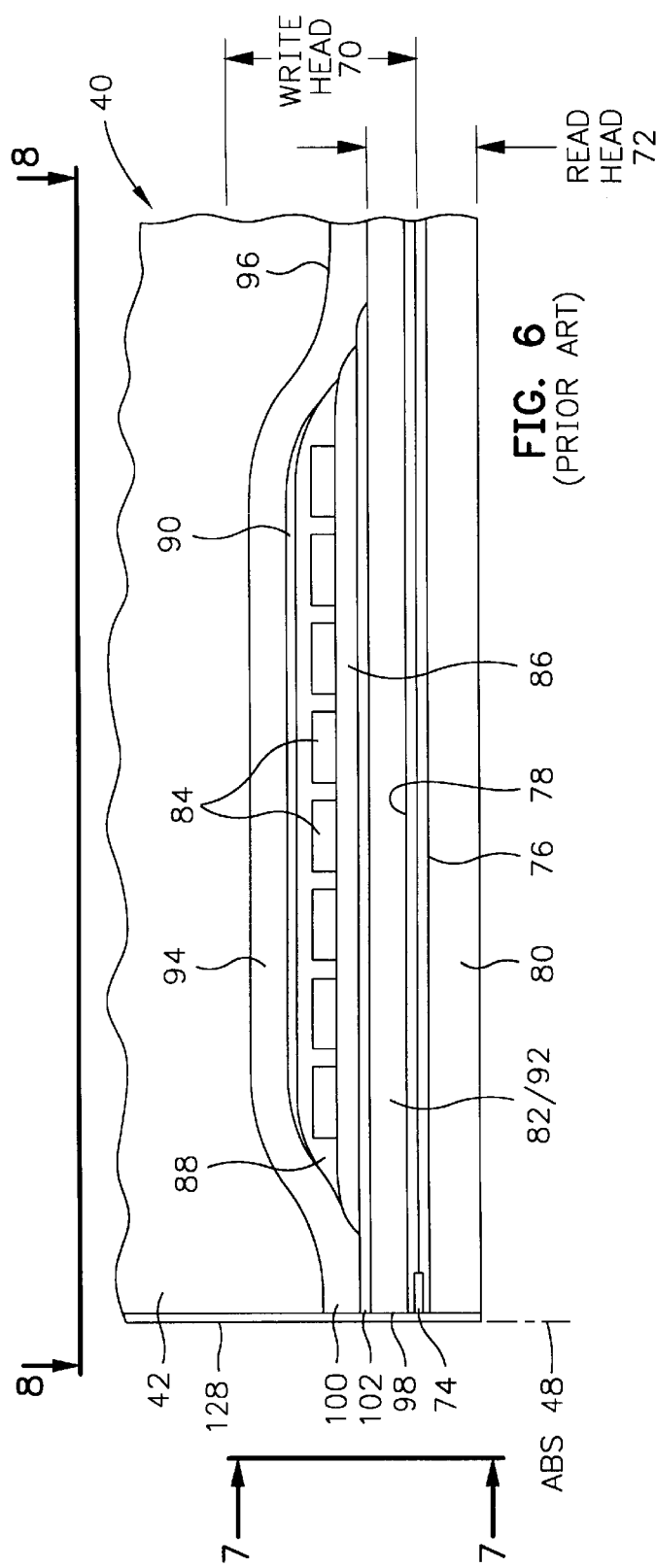
FIG. 6 is an enlarged partial view front portion of the slider and a prior art magnetic head as seen in plane 6—6 at FIG. 2.
Figure 7:
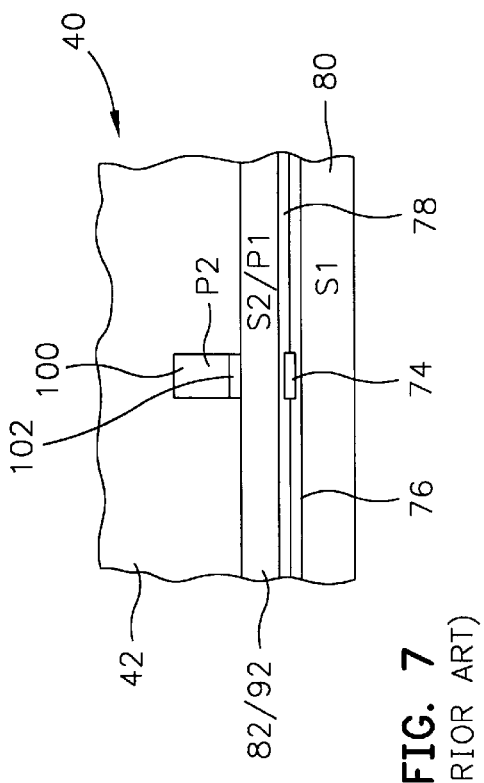
FIG. 7 is a partial view of the slider and the prior art magnetic head as seen in plane 7—7 at FIG. 6.

FIG. 6 is a side cross-sectional elevation view of the merged head 40 which has a prior art write head portion 70 and a read head portion 72, the read head portion employing a sensor 74. FIG. 7 is an ABS view of FIG. 6. The sensor 74 is located between first and second gap layers (G1 and G2) 76 and 78 and the gap layers are located between first and second shield layers (S1 and S2) 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

As shown in FIG. 6, the write head portion of the merged head includes a coil layer 84 located between first and second insulation layers (I1 and I2) 86 and 88. A third insulation layer (I3) 90 may be employed for planarizing the head to eliminate ripples in the second insulation layer caused by the coil layer 84. The first, second and third insulation layers are referred to in the art as an "insulation stack". The coil layer 84 and the first second and third insulation layers 86, 88 and 90 are located between first and second pole piece layers 92 and 94. The first and second pole piece layers (P1 and P2) 92 and 94 are magnetically coupled at a back gap 96 and have first and second pole tips 98 and 100 which are separated by a write gap layer (G3) 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6, and 7. It should be noted that the merged head 50 employs a single layer 82/92 to serve a double function as a second shield layer for the read head and as a first pole piece for the write head. A piggyback MR head employs two separate layers for these functions.

The Invention

In FIG. 9 a first embodiment 200 of the present invention is illustrated. The magnetic head 200 employs an elongated photoresist strip 202 which has been hard baked to provide the photoresist strip 202 with first and second substantially parallel elongated edges 204 and 206. The forward and rear edges 204 and 206 slope upwardly with the slope of the forward edge having an apex angle $\alpha$. The forward edge 204 defines the zero throat height (ZTH) of the magnetic head. The photoresist strip 202 has a width W between its forward and rear edges 204 and 206 which is preferably located entirely between the ABS and the first turn of the coil layer 84.

Figure 10A:
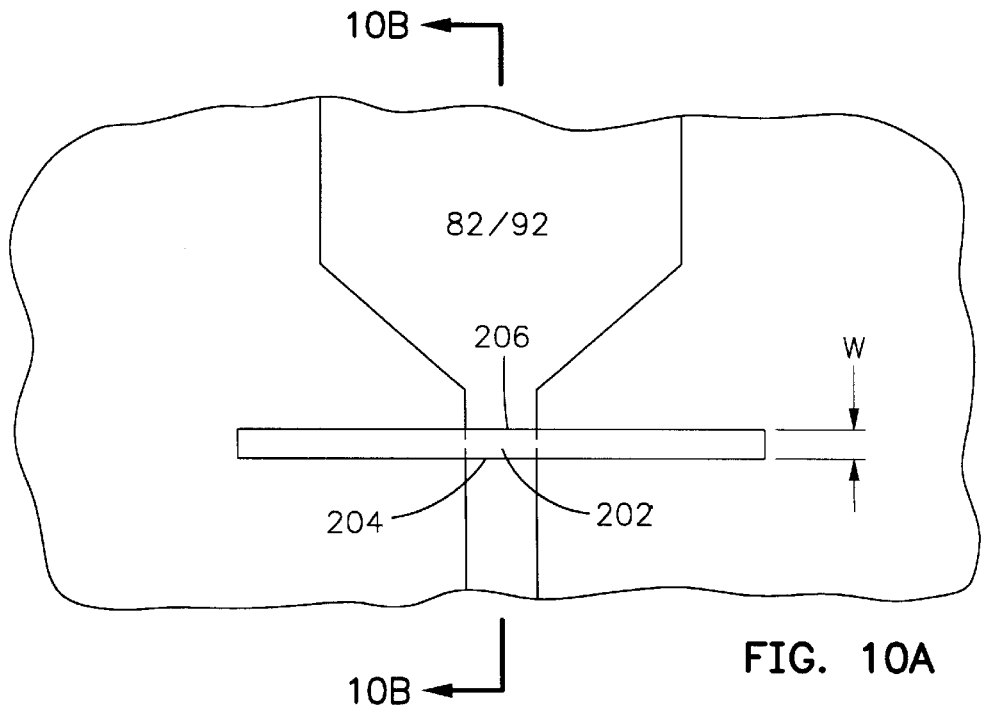
FIG. 10A is a partial plan view of a partially completed head showing the present photoresist strip for defining the zero throat height of the write head.
Figure 10B:
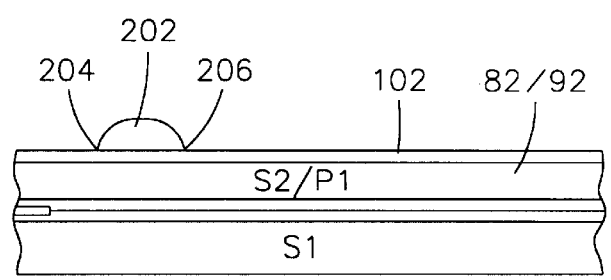
FIG. 10B is a view taken along plane 10B—10B of FIG. 10A.
Figure 10C:
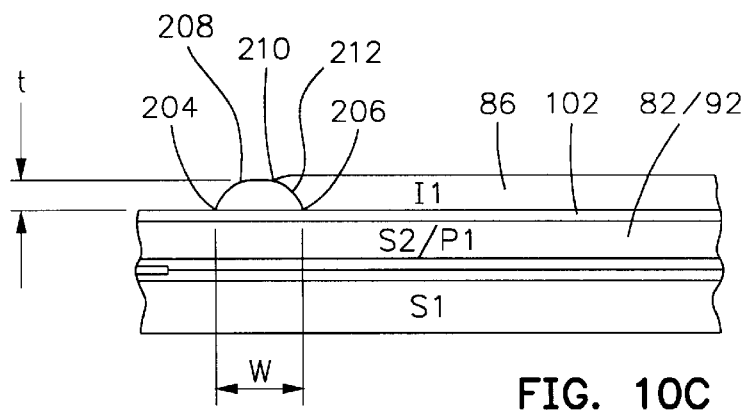
FIG. 10C is the same as FIG. 10B except a first insulation layer (I1) has been formed.

FIGS. 10A, 10B and 10C illustrate the various steps in the construction of the first embodiment shown in FIG. 9. After the formation of the first pole piece layer 82/92 and the gap layer 102, the photoresist strip 202 is formed transverse the head as shown in FIG. 10A. FIG. 10B is longitudinal cross section through FIG. 10A. FIG. 10C is the same as FIG. 10B except the fist insulation layer 86 of the insulation stack has been formed. As shown in FIG. 10C, the photoresist strip 202 has a first portion 208 which extends from the forward edge 204 to a forward edge 210 of the first insulation layer and a rear portion 212 which extends from the forward edge 208 of the first insulation layer to the rear edge 206. From FIG. 10C it can be seen that the first insulation layer 86 covers the rear portion 212 of the photoresist strip 202 and from FIG. 9 it can be seen that the second and/or the third insulation layers 88 and 90 and the second pole piece layer 94 cover the forward portion 208 of the photoresist strip 202.

Figure 16:
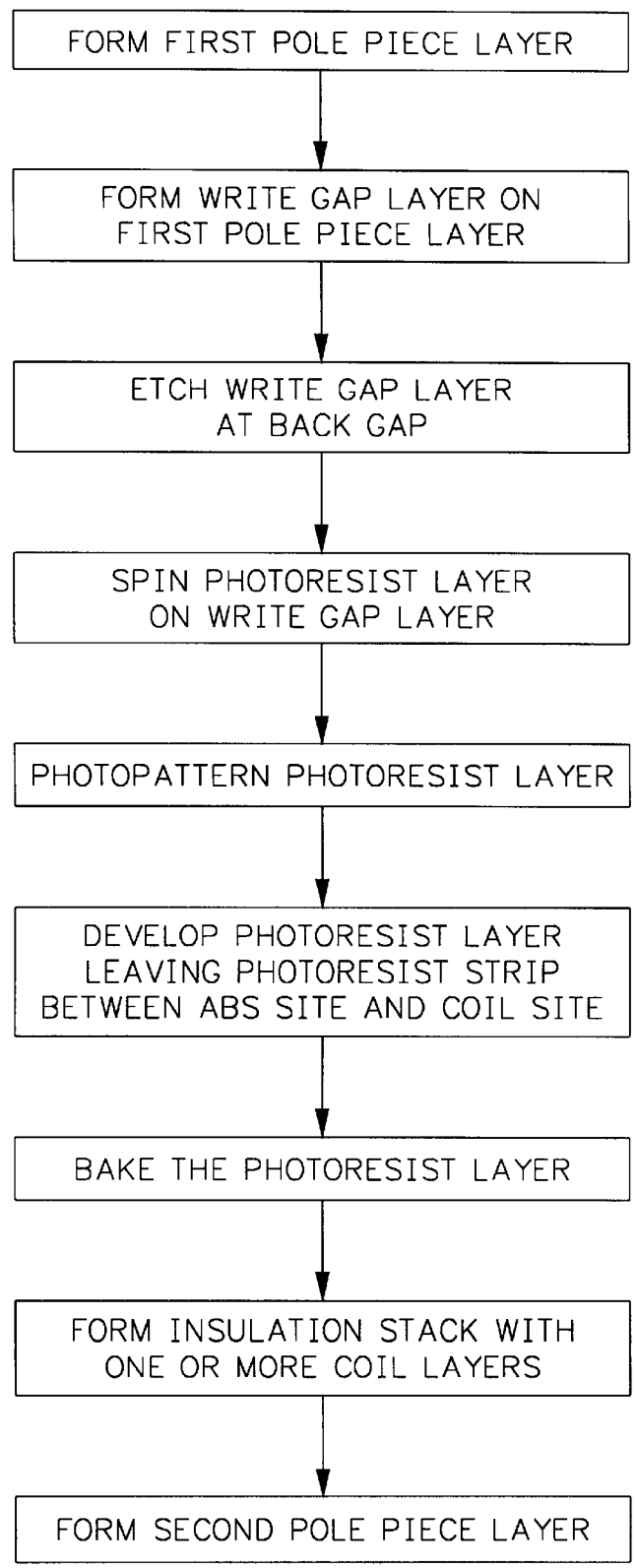
FIG. 16 is a block diagram of exemplary steps employed in making the present magnetic head.

FIG. 16 is an exemplary method of construction of the magnetic head 200 shown in FIG. 9. As shown in FIGS. 9 and 16, after constructing the read head portion of the magnetic head, which includes formation of the first pole piece layer 82/92, a write gap layer 102 is formed on the first pole piece layer 82/92. The write gap layer 102 etched at a back gap region as shown at 96 in FIG. 9, so that the second pole piece 94 can be subsequently connected to the first pole piece 82/92. Next a layer of photoresist is spun on the write gap layer 102. The photoresist layer is then photopatterned to prepare portions of the photoresist layer selected for removal by developing. The photoresist layer is then developed leaving the photoresist strip 202 between the ABS site and the coil site of the partially completed head. After the photoresist layer has been developed, the photoresist strip is baked at a high temperature, such as 270° C., which causes the photoresist strip 202 to slightly shrink and produce the sloping surfaces extending from the forward and rear edges 204 and 206. It should be realized that the shrinkage of the very narrow photoresist strip is many orders of magnitude less than the shrinkage of any one of the insulation of the insulation layers stack which, in the prior art, was employed for defining the zero throat height. In other words, the baking step results in a minimal movement of the forward edge 204 back into the head compared to the movement of the forward edge of the first insulation or any other insulation layer of the insulation stack back into the head. Accordingly, the very narrow photoresist strip of the present invention enables more accurate and predictable zero throat heights. This is important in establishing the designed positional relationship between the zero throat height and the stripe height 214 of the read head as shown in FIG. 9.

Further, by varying the thickness of the photoresist layer and/or the width W of the photoresist strip, the apex angle α can be more accurately defined with improved predictability. The thickness of the photoresist strip is approximately the thickness of the photoresist layer spun onto the partially completely head. The ratio of the thickness of the photoresist layer to the width of the photoresist strip t÷W which is referred to in the art as the apex ratio. The apex angle α is directly proportional to the aspect ratio. An increase in the aspect ratio produces an increase in the apex angle α. Accordingly, if the thickness of the photoresist layer is increased the apex angle α is increased. A preferred apex angle α is 35° which will minimize flux leakage between the first and second pole piece layers immediately behind the zero throat height. The width of the strip 202 may be on the order of 3–8 microns (μm). Next the insulation stack is formed with one or more coil layers. The insulation layers of the insulation stack have openings at the back gap region so that when the second pole piece is formed it makes connection with the first pole piece 82/92 as shown in FIG. 6.

Figure 11A:
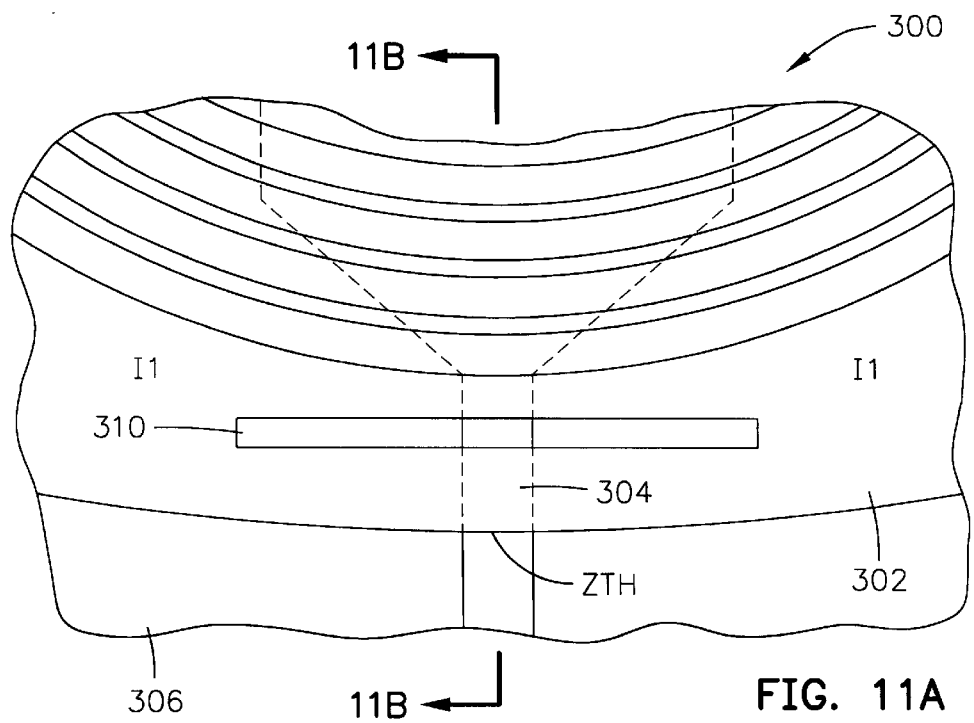
FIG. 11A is a plan view of a partially completed head showing the elongated photoresist strip of the present invention defined by an elongated hole in the first insulation layer of the insulation stack of the head.
Figure 11B:
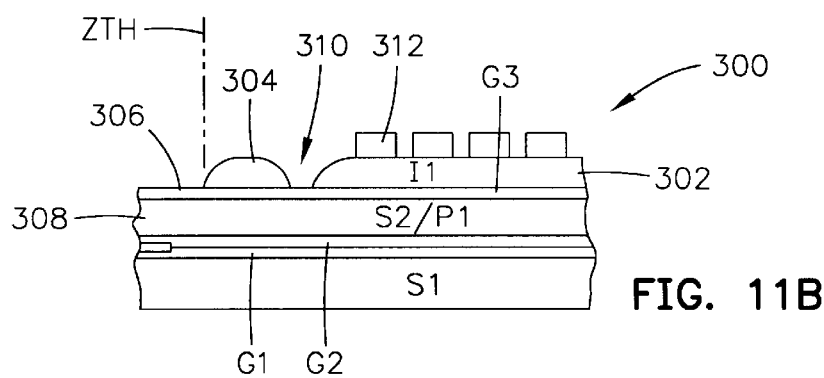
FIG. 11B is a view taken along plane 11B—11B of FIG. 11A.
Figure 11C:
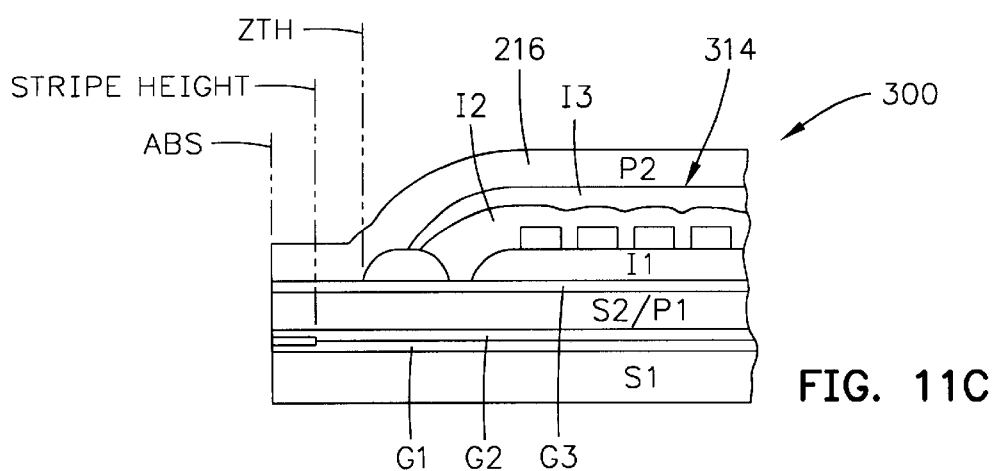
FIG. 11C is the same as FIG. 11B except the magnetic head has been completed.

FIG. 11A illustrates another embodiment 300 of the invention wherein the first insulation layer 302 of the insulation stack is employed for providing the photoresist strip 304. As shown in FIG. 11B, the gap layer 306 is formed on the first pole piece layer 308. The first insulation layer 302, which is a photoresist, is then formed on the gap layer 306 with an elongated opening 310. The elongated opening 310 forms the rear edge of the elongated strip 304. The first insulation layer 302 is made by spinning a photoresist layer onto the partially completely head and photopatterning the photoresist layer for removal of photoresist at the opening layer 310 for forming a periphery which defines the zero throat height (ZTH) and for providing an opening at the back gap discussed hereinabove. The patterned photoresist layer is thin baked which causes the sloping surfaces of the photoresist strip 304 as shown in FIG. 11B. The advantages of the embodiment 300 in FIG. 11A over the embodiment 200 in FIG. 9 is that the first insulation layer 302 of the insulation stack and the photoresist strip 304 can be made with one layer of photoresist. Next, the coil layer 312 is formed, as shown in FIG. 11B, followed by completion of the insulation stack 314 and the second pole piece layer 216 as shown in FIG. 11C.

Figure 12A:
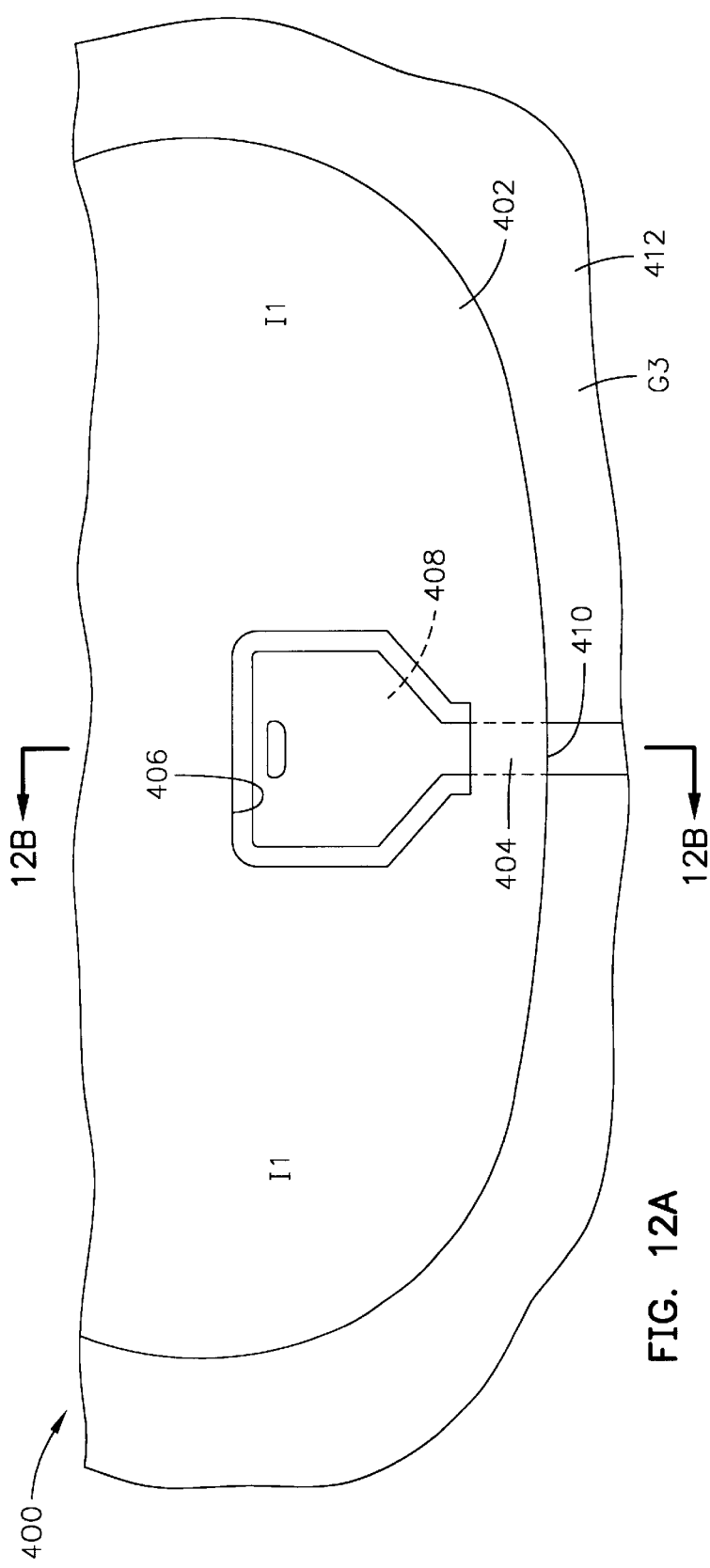
FIG. 12A is a plan view of a portion of a partially completed head showing the elongated photoresist strip of the present invention as defined by a hole in the first insulation layer of the insulation stack.
Figure 12B:
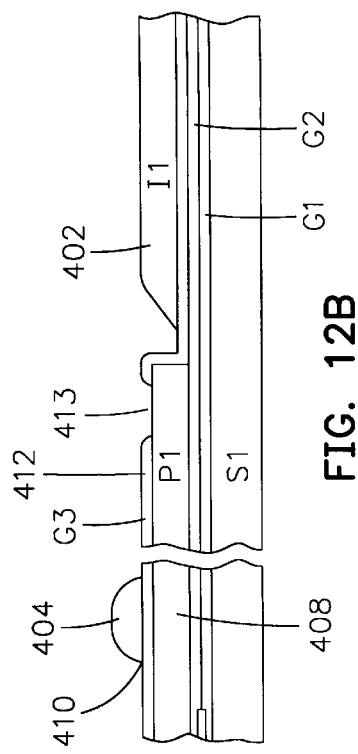
FIG. 12B is a view taken along plane 12B—12B of FIG. 12A.
Figure 12E:
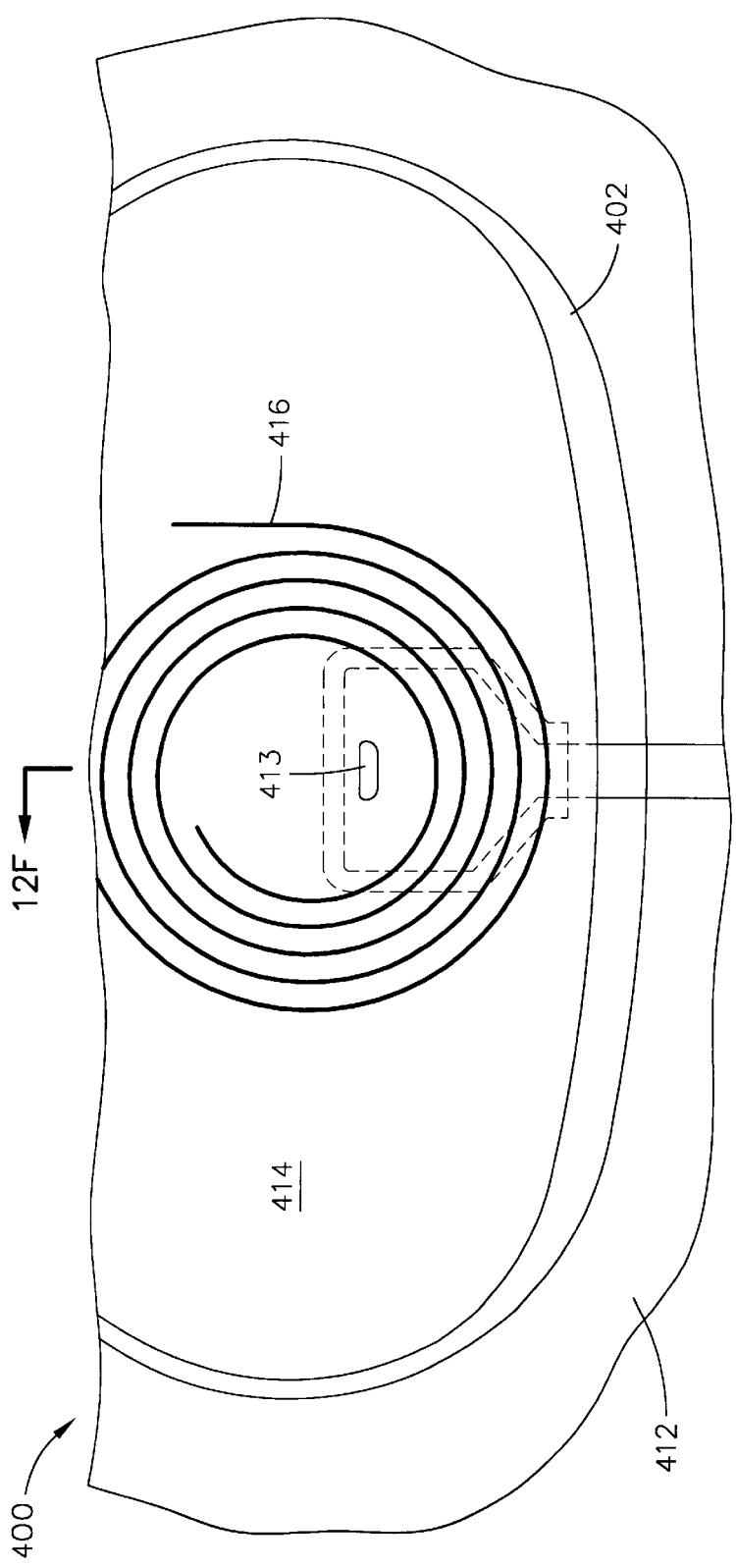
FIG. 12E is the same as FIG. 12A except a coil layer, shown schematically as a line, has been formed.
Figure 12F:
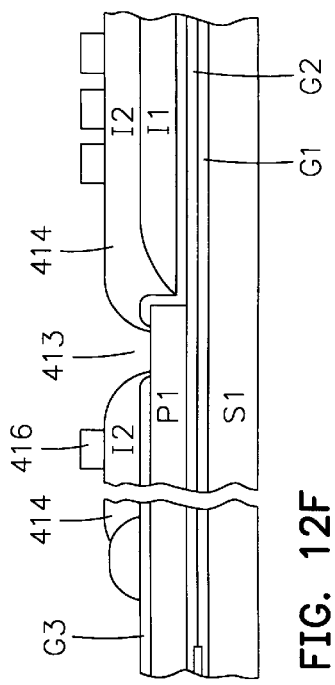
FIG. 12F is a view taken along plane 12F—12F of FIG. 12E.
Figure 12G:
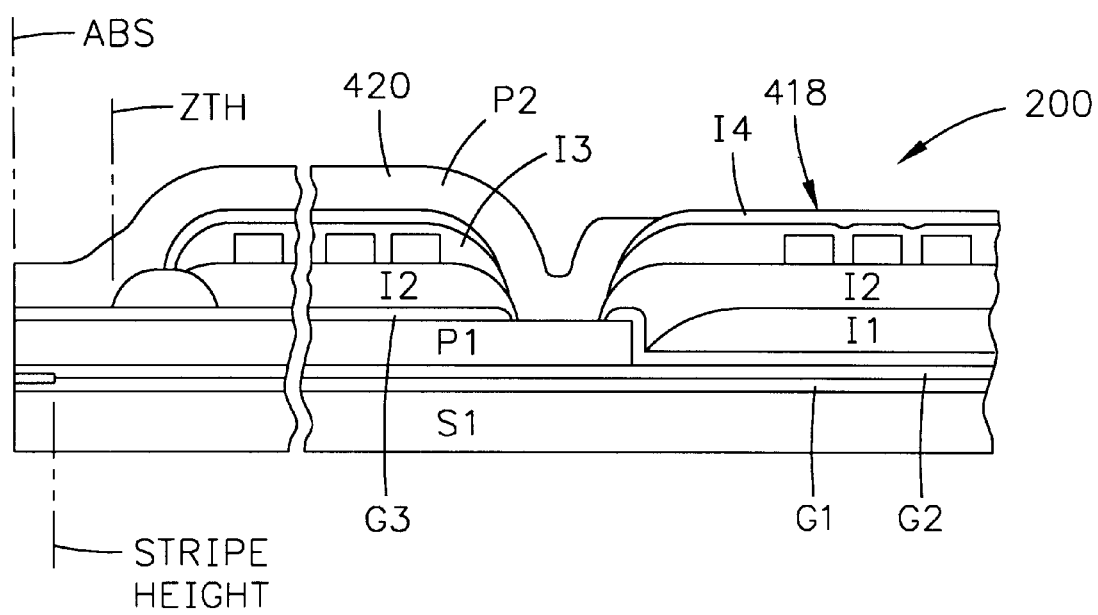
FIG. 12G is the same as FIG. 12F except the magnetic head has been completed.

FIG. 12A illustrates a further embodiment 400 of the present invention wherein a first insulation layer 402 of the insulation stack also provides the photoresist strip 404. This is accomplished by providing the first insulation layer 402 with an opening 406 which is slightly spaced from outside edges of the first pole piece layer 408. The forward edge 410 of the photoresist strip 404 defines the zero throat height of the head. As can be seen from FIG. 12B, the top surface of the first insulation layer 402 is substantially flush with the top surface of the write gap layer 412. The order of construction, shown in FIG. 12B, is formation of the first pole piece layer 408, formation of the write gap layer 412, etching the write gap layer to provide an opening 413 at the back gap and then formation of the first insulation layer 402 along with the photoresist strip 404. In FIGS. 12C and 12D, a second insulation layer 414 of the insulation stack is formed with a via at 413. In FIGS. 12E and 12F a coil layer 416 is formed on the second insulation layer 414 and in FIG. 12G the remainder of the magnetic head is completed by forming the remainder of the insulation stack 418 with a via at 413 and the second pole piece layer 420.

Figure 13A:
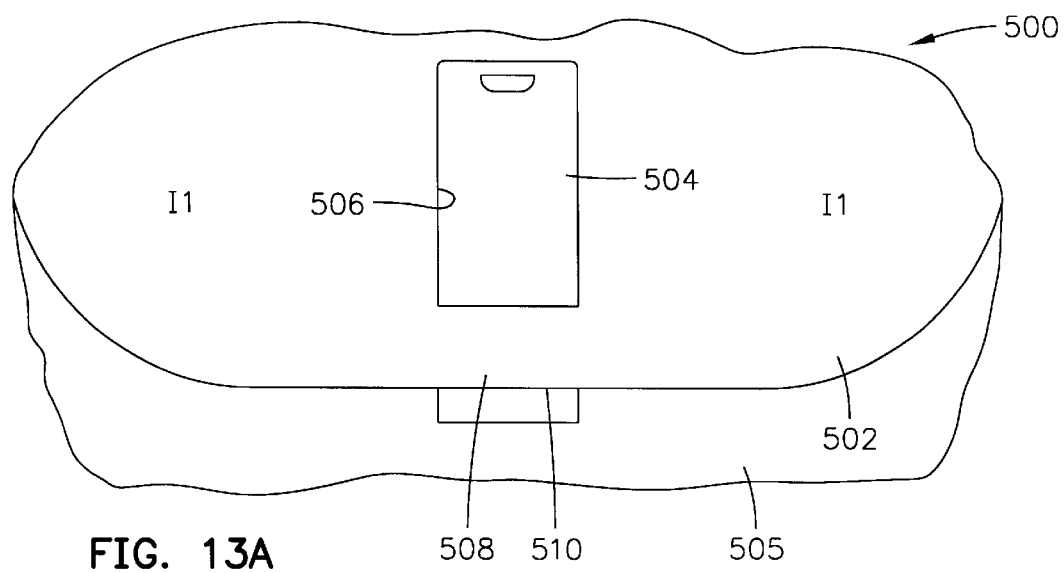
FIG. 13A is a plan view of a portion of another partially completed magnetic head embodiment of the present invention.
Figure 13B:
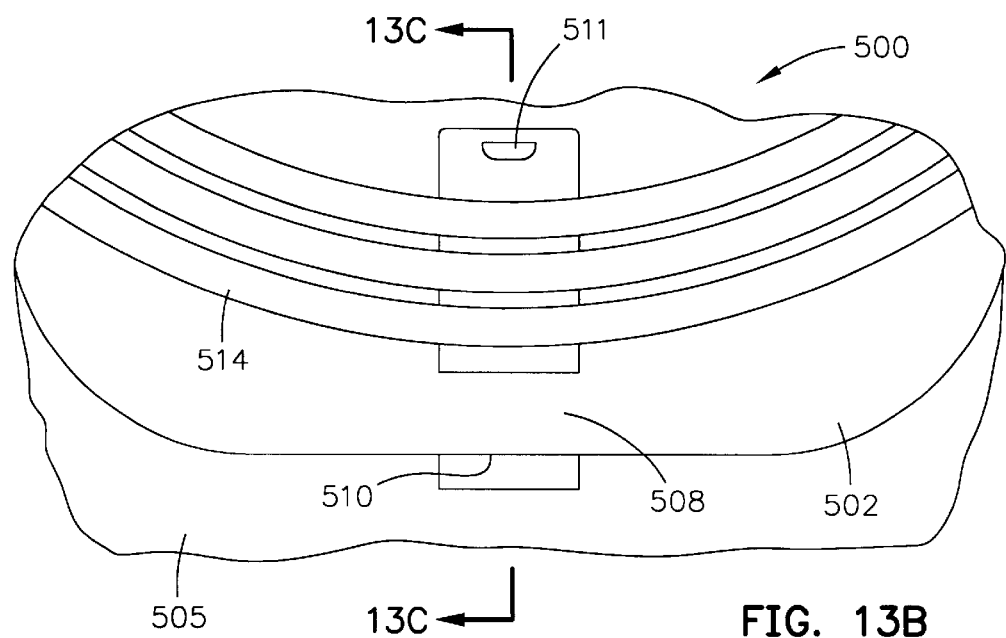
FIG. 13B is the same as FIG. 13A except a write gap layer and a coil layer have been formed.
Figure 13C:
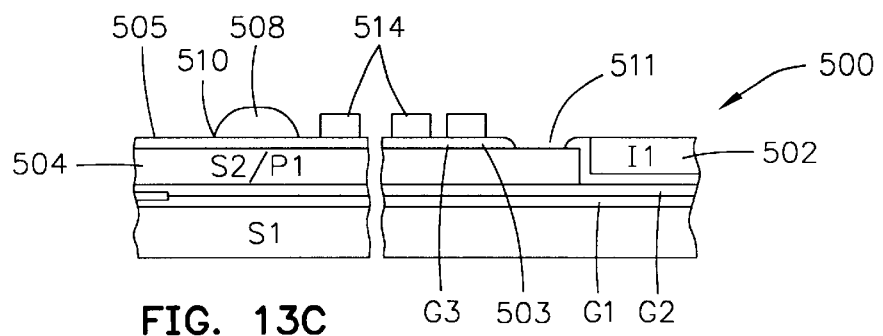
FIG. 13C is a view taken along plane 13C—13C of FIG. 13B.
Figure 13D:
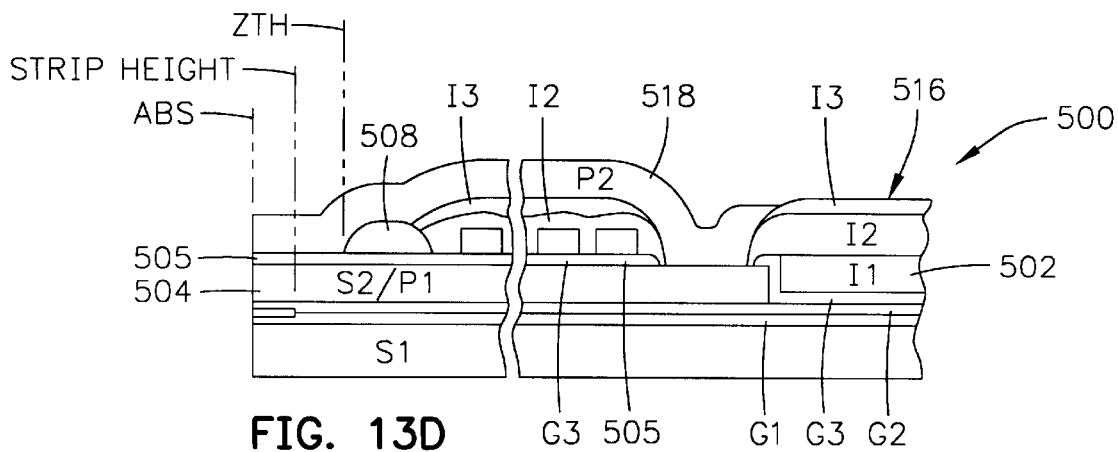
FIG. 13D is the same as FIG. 13C except the magnetic head has been completed.

FIGS. 13A through 13D illustrate still another embodiment 500 of the present invention. This embodiment is similar to the embodiment 400, shown in FIG. 12A, except the first insulation layer 502 is spaced from the sides edges of the first pole piece 504 by the write gap layer 505 (See FIG. 13D). The photopatterning of the photoresist layer provides the opening 506 which partially encompasses a back portion of the first pole piece layer 504 behind the photoresist strip 508. Accordingly, when the opening 506 is provided in the first insulation layer, the photoresist strip 508 is formed with a forward edge 510 which defines the zero throat height of the magnetic head. As shown in FIGS. 13B and 13C, the order of construction is formation of the write gap layer 505 on the first pole piece layer 504 with an opening or via at the back gap region, followed by formation of the first insulation 502 along with the photoresist strip 508 on the write gap layer and the opening 506 which exposes the via 511. The coil layer 514 is then formed followed by completion of the insulation stack 516 with vias at 511 and the second pole piece layer 518 to complete the head as shown in 13D.

Figure 14A:
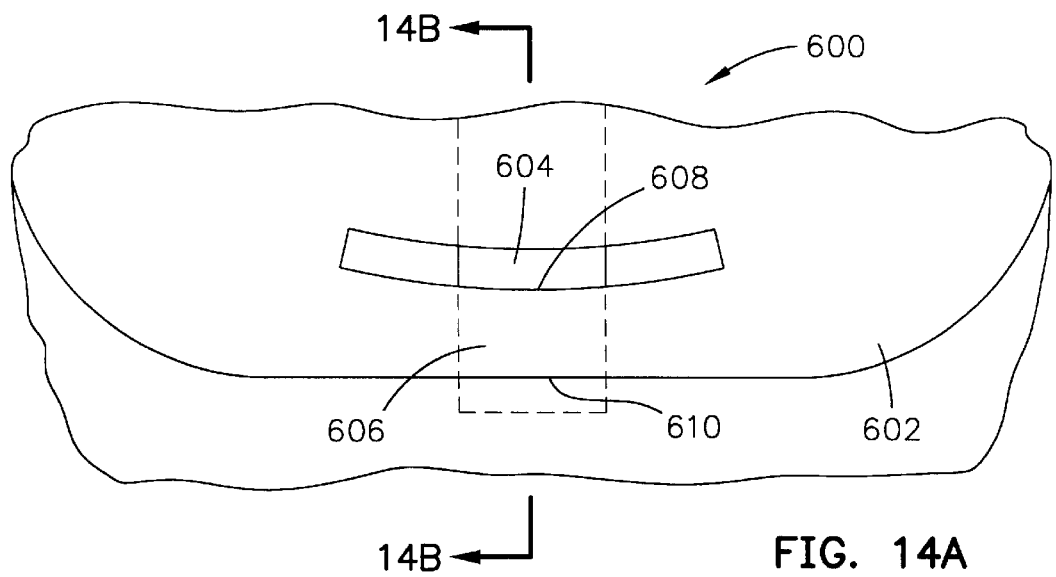
FIG. 14A is a plan view of a portion of still another embodiment of a partially completed head of the present invention.
Figure 14B:
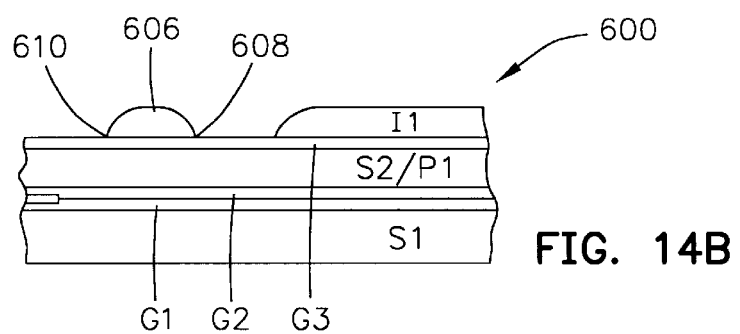
FIG. 14B is a view taken along plane 14B—14B of FIG. 14A.
Figure 14C:
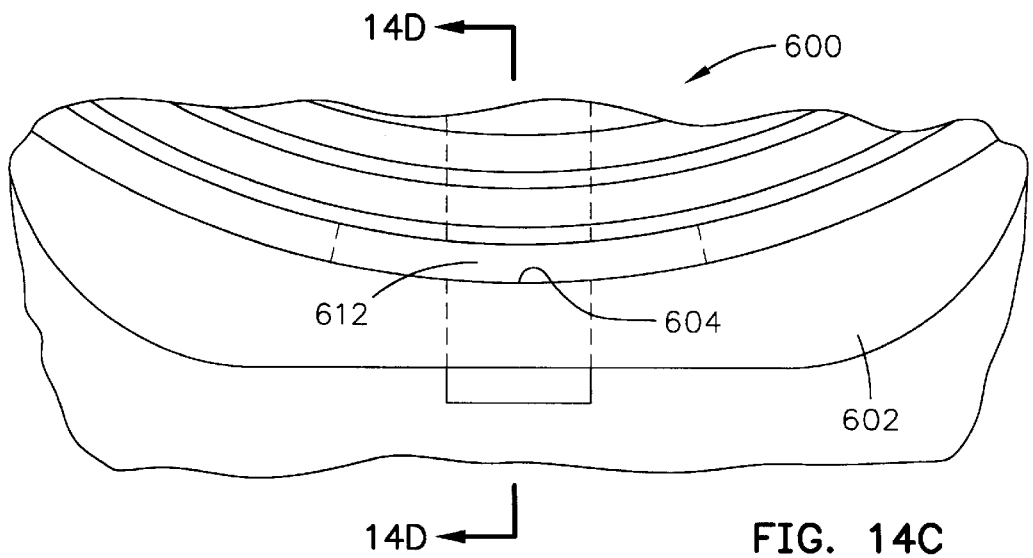
FIG. 14C is the same as FIG. 14A except a coil layer has been formed.
Figure 14D:
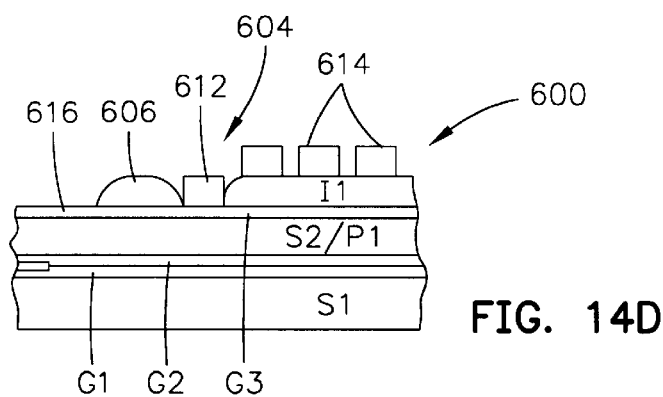
FIG. 14D is a view taken along plane 14D—14D of FIG. 14C.
Figure 14E:
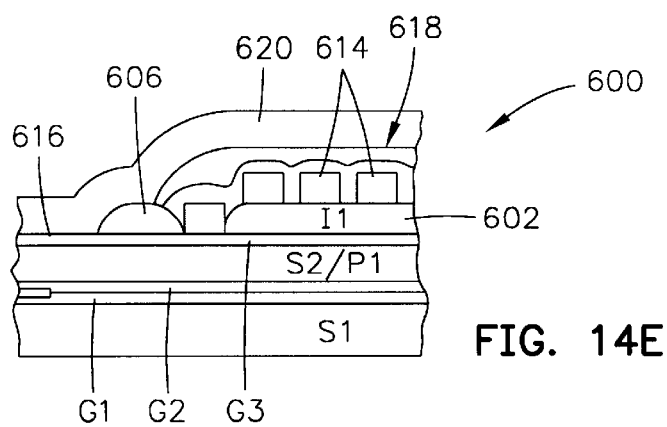
FIG. 14E is the same as FIG. 14D except the magnetic head has been completed.

FIGS. 14A through 14D illustrate still a further embodiment 600 of present invention. This embodiment is similar to the embodiment 300 shown in FIG. 11A except the first insulation layer 602 of the insulation stack is provided with a curved opening 604. The curved opening 604 provides the photoresist strip 606 with a slightly curved rear edge 608 and a substantially straight forward edge 610. As shown in FIGS. 14C and 14D, the forwarddmost turn 612 of the coil layer 614 is formed in the opening 604. The increased forward location of the coil layer 614 with respect to the ABS site is important for applying field to the first and second pole pieces as close as possible to the ABS so as to minimize flux leakage therebetween. The order of construction, as shown in FIG. 14D, is to form the first pole piece layer 614 followed by the write gap layer 616. The first insulation layer 602 is then formed on the gap layer 616 along with the photoresist strip 606 followed by formation of the coil layer 614. The head is completed, as shown in FIG. 14E, by forming the remainder of the insulation stack 618 followed by formation of the second pole piece layer 620.

Figure 15A:
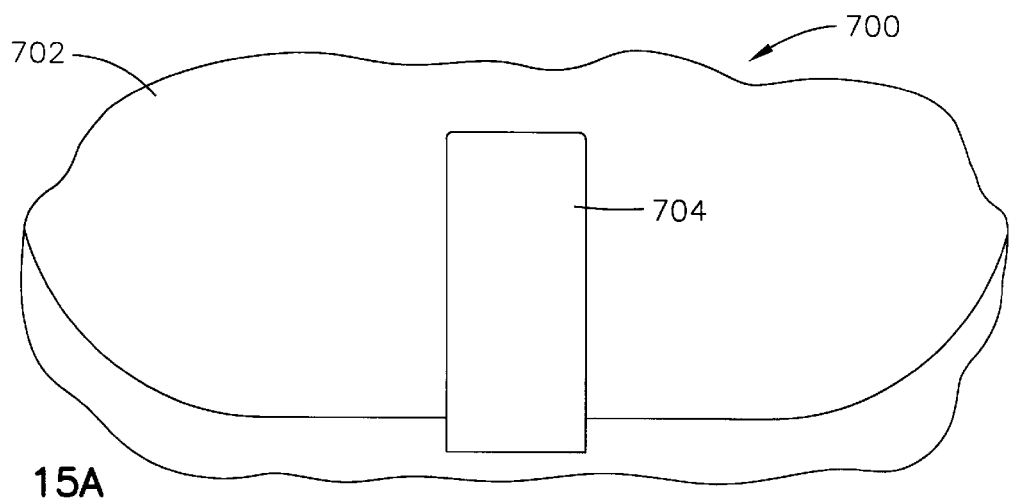
FIG. 15A is a plan view of a portion of still another embodiment of a partially completed magnetic head of the present invention showing the formation of a plannerizing layer adjacent the first pole piece layer.
Figure 15B:
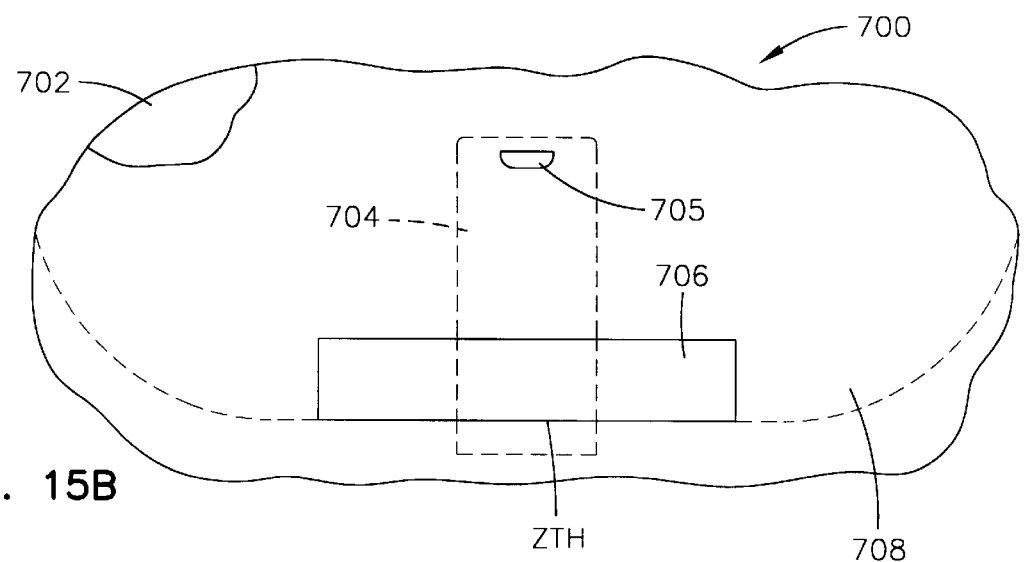
FIG. 15B is similar to FIG. 15A except a zero throat height defining insulation layer strip has been formed to define the zero throat height of the magnetic head.
Figure 15C:
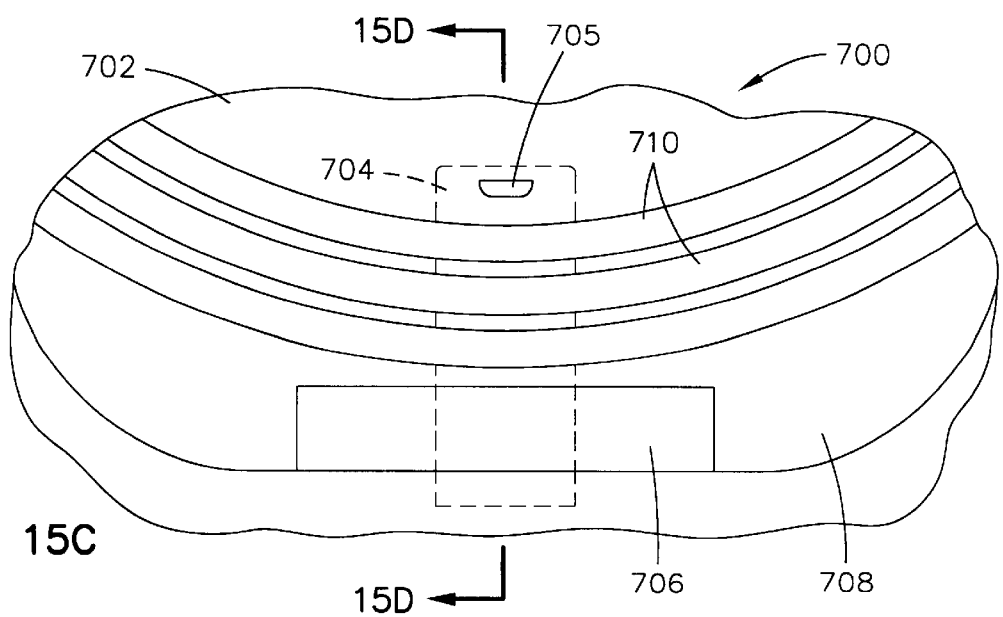
FIG. 15C is the same as FIG. 15B except a coil layer has been formed.
Figure 15D:
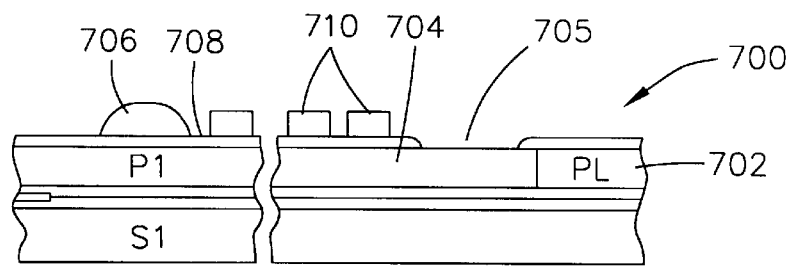
FIG. 15D is a view taken along plane 15D—15D of FIG. 15C.
Figure 15E:
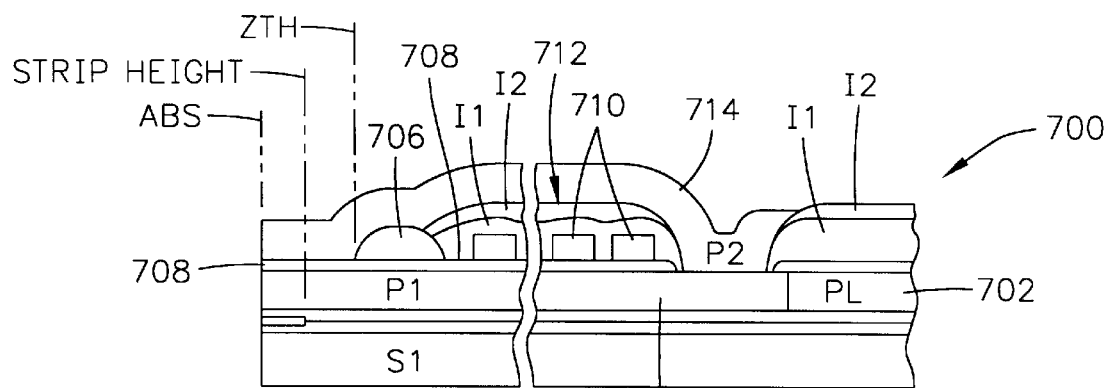
FIG. 15E is the same as FIG. 15D except the magnetic head has been completed.

FIGS. 15A through 15B illustrate still a further embodiment 700 of the present invention. In this embodiment a planarizing layer 702 is formed adjacent the side and back of the first pole piece layer 704 as shown in FIG. 15A. The top surface of the planarizing layer 702 is preferably substantially flush with the top surface of the first pole piece layer 704 as shown in FIGS. 15A and 15D. As shown in FIG. 15B, a write gap layer 708 is formed on top of the first pole piece 704 and the planarizing layer 702 with a via at 705 and the photoresist strip 706 may be formed on top of the write gap layer 702. If desired the write gap layer 708 can be formed prior to the planarizing layer 702 in which case the planarizing layer would be formed on top of the write gap layer 708. As shown in FIG. 15E the magnetic head 700 is completed by formation of the coil layer 710 and the remainder of the insulation layers of insulation stack 712 with vias at 709 followed by formation of the second pole piece layer 714. The planarizing layer 708 may be omitted if the first pole piece layer 704 is formed with sufficient width to support the entire width of the front located turns of the coil layer.

It should be appreciated that the present invention provides a photoresist strip which enables accurate placement of the zero throat height with high predictability. This enables the zero throat height to be located, as designed, with respect to the strip height of the sensor of the read head portion of the head. Further, the photoresist strip enables the construction of a desired aspect ratio for minimizing flux leakage between the first and second pole piece layers. Photoresist materials comprehend a broad class of compositions. Generally, the inventions contemplate use of any material that acts like photoresist. Therefore, each of the aforementioned embodiments provide various benefits heretofore unobtainable in the prior art.

Clearly, the other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

We claim:

1. A method of making a magnetic head having a top and a bottom and front and rear ends and an air bearing surface (ABS) that defines the front end, comprising:

forming first and second pole piece layers with the first and second pole piece layers being separated by a write gap layer at the ABS and connected at a back gap that is recessed rearwardly in the head from the ABS;

forming a zero throat height (ZTH) defining layer of baked photoresist that is sandwiched between the first and second pole piece layers with the ZTH defining layer having a rounded front edge where the first and second pole piece layers first separate from one another after the ABS to define the ZTH; and forming an insulation stack between the first and second pole piece layers wherein the insulation stack has at least first and second insulation layers with at least one coil layer embedded therein and with the insulation stacked placed so that the ZTH defining layer is located entirely between the ABS and the at least one coil layer.

2. A method as claimed in claim 1, further including:

forming the ZTH defining layer with front and rear portions; and forming a portion of the second pole piece layer directly on the front portion of the ZTH defining layer and forming a portion of the insulation stack directly on the rear portion of the ZTH defining layer.

3. A method of making a magnetic head having a top and a bottom and front and rear ends and an air bearing surface (ABS) that defines the front end, comprising the steps of:

forming first and second pole piece layers with the first and second pole piece layers being separated by a write gap layer at the ABS and connected at a back gap that is recessed rearwardly in the head from the ABS;

forming a zero throat height (ZTH) defining layer of baked photoresist that is sandwiched between the first and second pole piece layers with the ZTH defining layer having a rounded front edge where the first and second pole piece layers first separate from one another after the ABS to define the ZTH;

forming an insulation stack between the first and second pole piece layers wherein the insulation stack has at least first and second insulation layers with at least one coil layer embedded therein and with the insulation stack placed so that the ZTH defining layer is located entirely between the ABS and the at least one coil layer; and forming the ZTH defining layer directly on the write gap layer.

4. A method as claimed in claim 3, further including:

forming the ZTH defining layer with front and rear portions; and forming a portion of the second pole piece layer directly on the front portion of the ZTH defining layer and forming a portion of the insulation stack directly on the rear portion of the ZTH defining layer.

5. A method of making a magnetic head having a top and a bottom and front and rear ends and an air bearing surface (ABS) that defines the front end, comprising:

forming first and second pole piece layers with the first and second pole piece layers being separated by a write gap layer at the ABS and connected at a back gap that is recessed rearwardly in the head from the ABS;

forming a zero throat height (ZTH) defining layer of baked photoresist that is sandwiched between the first and second pole piece layers with the ZTH layer having a front end where the first and second pole piece layers first separate from one another after the ABS to define the ZTH;

forming an insulation stack between the first and second pole piece layers wherein the insulation stack has at least first and second insulation layers with at least one coil layer embedded therein and with the insulation stacked placed so that the ZTH defining layer is located entirely between the ABS and the at least one coil layer;

forming the first insulation layer of the insulation stack of baked photoresist with a hole that divides the first insulation layer into first and second portions; and forming the first portion of the first insulation layer as said ZTH defining layer.

6. A method as claimed in claim 5, further including:

forming the second portion of the first insulation layer with a top surface that is substantially planar; and forming said at least one coil layer directly on said top surface of the first insulation layer.

7. A method as claimed in claim 5, further including:

forming the hole so that the hole encompasses first and second side edges and a back end edge of a top surface of the first pole piece layer;

forming the second insulation layer on the first insulation layer and on the top surface of the first pole piece layer with a substantially planar top surface that extends thereacross;

forming said at least one coil layer on a top surface of the second insulation layer; and said insulation layer including a third insulation layer which covers said at least one coil layer.

8. A method as claimed in claim 7, further including:

forming the ZTH defining layer with front and rear portions; and forming the second insulation layer with a front portion that is located directly on the rear portion of the ZTH defining layer and the second pole piece layer with a front portion that is located directly on the front portion of the ZTH defining layer.

* * * * *